United States Patent
Hosoda

(10) Patent No.: US 11,838,482 B2
(45) Date of Patent: Dec. 5, 2023

(54) IMAGE FORMING APPARATUS HAVING MULTI-FACTOR AUTHENTICATION FUNCTION

(71) Applicant: CANON KABUSHIKI KAISHA, Tokyo (JP)

(72) Inventor: Yasuhiro Hosoda, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/577,984

(22) Filed: Jan. 18, 2022

(65) Prior Publication Data
US 2022/0239799 A1    Jul. 28, 2022

(30) Foreign Application Priority Data
Jan. 22, 2021 (JP) ................ 2021-009132

(51) Int. Cl.
*H04N 1/44* (2006.01)
*H04L 9/40* (2022.01)

(52) U.S. Cl.
CPC ........ *H04N 1/4406* (2013.01); *H04L 63/101* (2013.01); *H04L 2463/082* (2013.01)

(58) Field of Classification Search
None
See application file for complete search history.

(56) References Cited

U.S. PATENT DOCUMENTS

| | | | |
|---|---|---|---|
| 2007/0136581 A1 | 6/2007 | Hoghaug et al. | |
| 2016/0337553 A1* | 11/2016 | Sato | G06F 3/12 |
| 2020/0106921 A1 | 4/2020 | Nakayama | |
| 2020/0304512 A1* | 9/2020 | Shinnaka | H04L 9/0897 |

FOREIGN PATENT DOCUMENTS

JP    2019155610 A    9/2019

* cited by examiner

*Primary Examiner* — Andrew H Lam
(74) *Attorney, Agent, or Firm* — CANON U.S.A., INC. IP Division

(57) ABSTRACT

There is provided an image forming apparatus having security against cyberattacks by establishing an authentication factor for a remote access user that is different from an authentication factor employed in multi-factor authentication of local access.

10 Claims, 13 Drawing Sheets

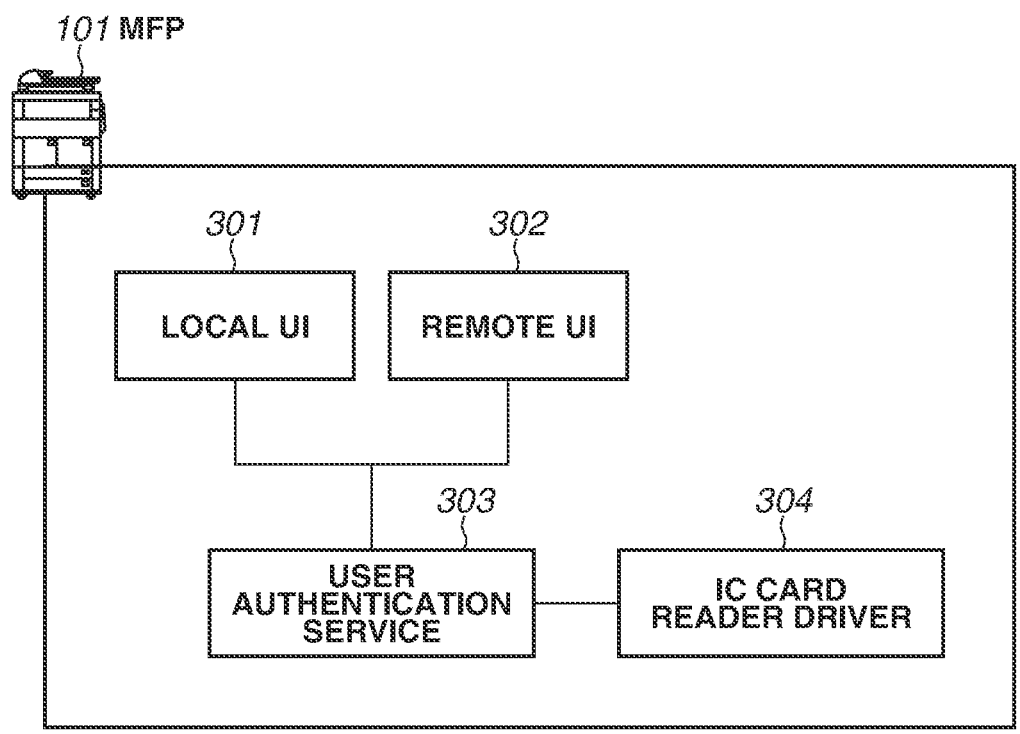

FIG.4

USER AUTHENTICATION SETTINGS — 401

LOCAL UI AUTHENTICATION SETTINGS — 402

404:
- ○ NO AUTHENTICATION
- ● IC CARD AUTHENTICATION

LOCAL UI MULTI-FACTOR AUTHENTICATION SETTINGS

USE OF MULTI-FACTOR AUTHENTICATION (PIN)

405:
- ○ DO NOT REQUIRE
- ○ REQUIRE ONLY ADMINISTRATORS TO USE PIN
- ● REQUIRE ALL USERS TO USE PIN

LOGIN OF USER WITHOUT REGISTERED PIN

406:
- ○ REGISTER PIN IN IC CARD AUTHENTICATION
- ● PROHIBIT LOGIN TO LOCAL UI

REMOTE UI MULTI-FACTOR AUTHENTICATION SETTINGS — 403

USE OF MULTI-FACTOR AUTHENTICATION (ONE-TIME PASSWORD)

407:
- ○ DO NOT REQUIRE
- ○ REQUIRE ONLY ADMINISTRATORS TO USE ONE-TIME PASSWORD
- ● REQUIRE ALL USERS TO USE ONE-TIME PASSWORD

LOGIN OF USER WITHOUT REGISTERED ONE-TIME PASSWORD

408:
- ● REGISTER ONE-TIME PASSWORD IN LOGIN TO REMOTE UI
- ○ PROHIBIT LOGIN TO REMOTE UI (REGISTER ONE-TIME PASSWORD ON LOCAL UI IN NEXT LOGIN TO LOCAL UI)

USER MANAGEMENT

[REGISTER] [EDIT] [DELETE]

| | USERNAME | ROLE | EMAIL |
|---|---|---|---|
| ☐ | Admin | Administrator | admin@canon.com |
| ☐ | Alice | Administrator | alice@canon.com |
| ☐ | Bob | GeneralUser | bob@canon.com |
| ☐ | Carol | GeneralUser | carol@canon.com |
| ☐ | Dave | LimitedUser | dave@canon.com |

502

EDIT USER

USERNAME: Alice

PASSWORD: ********

PIN: ******

CARD ID: 44E7158E...

ONE-TIME PASSWORD: STATE: ACTIVATED [DEACTIVATE]

ROLE: [Administrator ▽]

EMAIL ADDRESS: [alice@canon.com]

601

EDIT MY-PROFILE

USERNAME: Bob

PASSWORD: [********]

PIN: [******]

CARD ID: 045BB438...

ONE-TIME PASSWORD: STATE: DEACTIVATED  [ACTIVATE] *602*

ROLE: GeneralUser

EMAIL ADDRESS: [bob@canon.com]

↓ ACTIVATE BUTTON IS PRESSED

603

ACTIVATE ONE-TIME PASSWORD

READ QR CODE WITH MOBILE APPLICATION SUPPORTING TOTP

SECRET:
GVQYVMXCE5KDCMXUKQIKLZJEHCDYHLHG

ONE-TIME PASSWORD [          ]

[CANCEL]            [CONFIRM]

FIG.13

```
To: alice@canon.com
SUBJECT: MULTI-FACTOR AUTHENTICATION SETTING FOR MFP101   ~1301
From: mfp101@canon.com
```

```
BODY:
DEAR ALICE

TWO-FACTOR AUTHENTICATION SETTING FOR MFP 101 IN USE BY    ~1302
YOU HAS BEEN APPLIED BY ADMINISTRATOR.

PLEASE READ ATTACHED QR CODE WITH MOBILE APPLICATION
TO USE TWO-FACTOR AUTHENTICATION.
ATTACHED QR CODE IS FOR YOU ONLY. KEEP IT PRIVATE.
   SECRET: GVQYVMXCE5KDCMXUKQIKLZJEHCDYHLHG
```

ATTACHMENT:

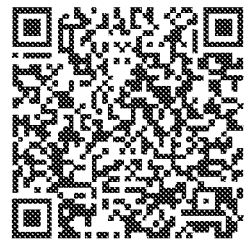

~1303

IMAGE FORMING APPARATUS HAVING MULTI-FACTOR AUTHENTICATION FUNCTION

BACKGROUND OF THE INVENTION

Field of the Invention

The present invention relates to an image forming apparatus having a multi-factor authentication function, a method of controlling the image forming apparatus, and a storage medium.

Description of the Related Art

Cyberattacks has been becoming sophisticated in recent years, and multi-factor authentication has been introduced against the sophisticated cyberattacks. Multi-factor authentication has three factors of "knowledge information", "possession information", and "biometric information". The "knowledge information" refers to information that only the user knows, such as a password or personal identification number (PIN). The "possession information" refers to something that only the user possesses, such as an integrated circuit (IC) card or a hardware token (one-time password). The "biometric information" is biologically inherent information/characteristic that the user has, such as fingerprint, vein, or face.

Use of multi-factor authentication using a combination of a plurality of "knowledge information", "possession information", and "biometric information" provides protection against cyberattacks and reduces a risk of improper use of the system. User authentication using an IC card issued as an employee identification card is provided as a method of user authentication in using an operation panel of an image forming apparatus installed in an office. Since user authentication is executed simply by holding the IC card near a reader, the method is highly convenient and is widely used.

Further, there is an image forming apparatus that provides a method of multi-factor authentication using a combination of an IC card as "possession information" and a password or a PIN as "knowledge information". Further, there is another image forming apparatus that provides a method of multi-factor authentication using a combination of an IC card as "possession information" and biometric authentication (refer to Japanese Patent Application Laid-Open No. 2019-155610).

Further, an image forming apparatus includes a webserver function that enables access from a web browser of a personal computer (PC) terminal. Thus, a user can remotely access the image forming apparatus using the web browser of the PC terminal and operate a HyperText Markup Language (HTML) user interface. Hereinafter, the HTML user interface will be referred to as "remote UI". In general, "knowledge information" such as ID and password is used to authenticate a user of the remote UI of the image forming apparatus.

Multi-factor authentication using a combination of an IC card as "possession information" and a PIN and a password as "knowledge information" is a method of multi-factor authentication in using an operation of an image forming apparatus. However, there is an issue that the method of multi-factor authentication is not provided for the remote UI. Furthermore, some PC terminals that use the remote UI do not include an authentication function for use in using a local user interface (local UI) of the image forming apparatus. For example, many PC terminals do not include an IC card reading device, and there is an issue that IC card authentication cannot be used as a method of multi-factor authentication in using the remote UI.

SUMMARY OF THE INVENTION

The present invention is directed to an image forming apparatus having security against cyberattacks by establishing an authentication factor for a remote access user that is different from an authentication factor employed in multi-factor authentication of local access.

According to an aspect of the present invention, an image forming apparatus having a function including at least a print function, includes a first authentication unit configured to authenticate local access to a local user interface (UI) function of the image forming apparatus, and a second authentication unit configured to authenticate remote access to a remote UI function of the image forming apparatus, wherein the first authentication unit and the second authentication unit support multi-factor authentication, and at least one authentication factor of the second authentication unit is different from an authentication factor of the first authentication unit.

Further features of the present invention will become apparent from the following description of embodiments with reference to the attached drawings.

BRIEF DESCRIPTION OF THE DRAWINGS

FIG. 3 is a block diagram illustrating a software configuration.

FIG. 4 is a diagram illustrating a user interface for user authentication settings.

FIG. 5 is a diagram illustrating a user interface for user management.

FIG. 13 is a diagram illustrating an example of a transmitted email.

DESCRIPTION OF THE EMBODIMENTS

Various embodiments of the present invention will be described below with reference to the drawings.

A multi-function peripheral (MFP) that is installed in an office and includes copy, print, and scan functions will be described as an example of an image forming apparatus according to a first embodiment of the present invention.

<System Configuration>

Figure 1:
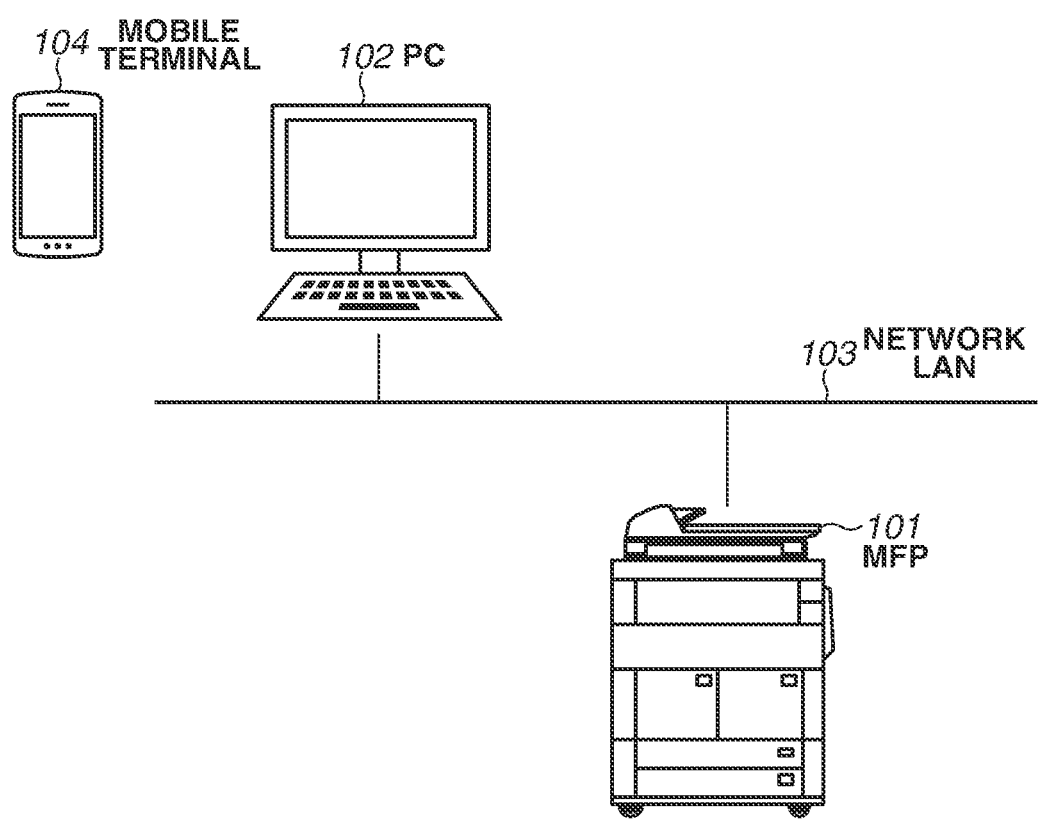
FIG. 1 is a diagram illustrating a network configuration.

A network configuration in an office environment according to the present embodiment will be described first with reference to FIG. 1.

An MFP 101 is an MFP that includes at least a print function and to which the present invention is applied. The MFP 101 communicates with a personal computer terminal (e.g., PC 102) connected to the MFP 101 via a network local area network (network LAN) 103. A user accesses the MFP 101 from a web browser of the PC terminal to use a remote user interface (remote UI) of the MFP 101. Further, the MFP 101 can receive print jobs from the terminal (e.g., PC 102).

Each user possesses one or more mobile terminals 104. The mobile terminals 104 do not have to be connected to the network LAN 103 in implementing the present embodiment. A mobile application that supports Time-based One-time Password (TOTP) described below is installed in each mobile terminal 104 and is used to generate a one-time password. The one-time password is issued via the mobile terminal 104 that the user possesses, so that software token authentication is possession information authentication and is one of the authentication factors of multi-factor authentication. In the office environment, it is assumed that there is also a plurality of other MFPs (not illustrated), PC terminals (not illustrated), and mobile terminals (not illustrated) having similar configurations.

<Hardware Configuration>

Figure 2:
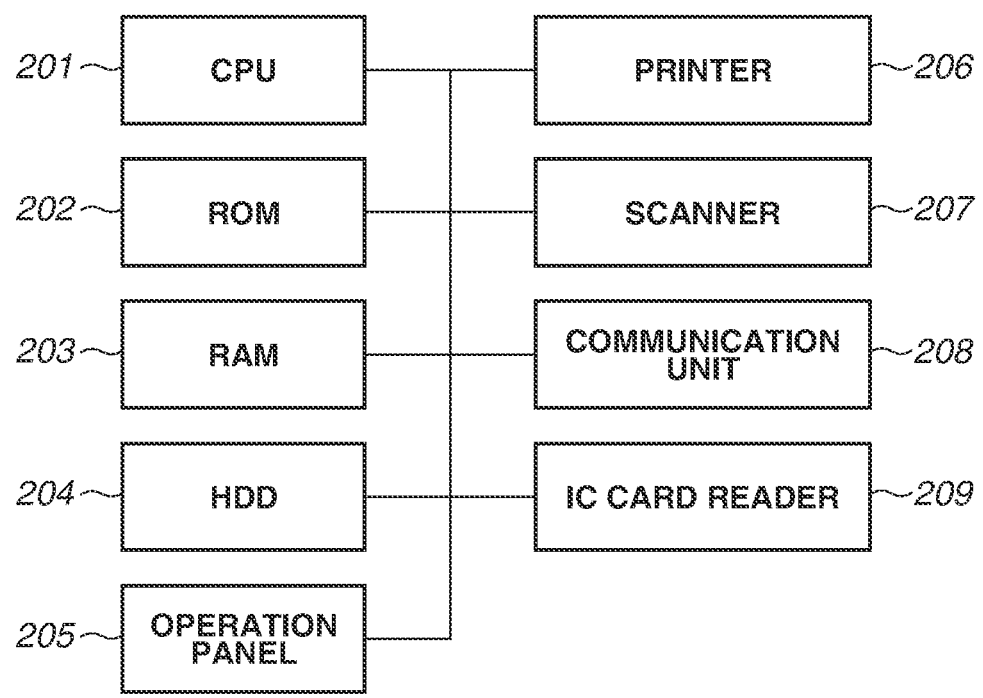
FIG. 2 is a block diagram illustrating a hardware configuration of a multi-function peripheral (MFP).

FIG. 2 is a block diagram illustrating a hardware configuration of the MFP 101. A central processing unit (CPU) 201 is a central processing unit (processor) that controls operations of the entire MFP 101. A random access memory (RAM) 203 is a volatile memory and a work area and is used as a temporary storage area for loading various control programs stored in a read-only memory (ROM) 202 and a hard disk drive (HDD) 204.

The ROM 202 is a non-volatile memory and stores a boot program and the like of the MFP 101. The HDD 204 is a non-volatile hard disk drive and has a capacity larger than the RAM 203. The HDD 204 stores a program for MFP control. The HDD 204 also stores an operating system (OS) and application programs.

The CPU 201 executes the boot program stored in the ROM 202 in activating the MFP 101. The boot program is for reading a program of the OS stored in the HDD 204 and loading the read program on the RAM 203. After executing the boot program, the CPU 201 then executes the program of the OS loaded on the RAM 203 and controls the MFP 101. Further, the CPU 201 also stores data for use in operations based on the control program on the RAM 203 and performs reading and writing.

While the single CPU 201 of the MFP 101 executes each process illustrated in flowcharts described below, any other forms can be employed. For example, a plurality of CPUs or microprocessors (MPUs) can cooperate to execute the processes illustrated in the flowcharts. Further, part of the processes can be executed using a hardware circuit such as an application-specific integrated circuit (ASIC) or a field-programmable gate array (FPGA).

An operation panel 205 is a display that can be operated by touching. A printer 206 is a printer engine that prints print data received externally via a communication unit 208 and digital data acquired from a scanner 207. The scanner 207 is a scanner device that reads paper documents and converts the read documents into digital data. The communication unit 208 is a network interface for connecting to the Internet and local area networks (LANs) in the office. An integrated circuit (IC) card reader 209 is a device that reads, from an IC card, information for use in user authentication. The IC card reader 209 is a unit for realizing IC card authentication.

<Software Configuration>

FIG. 3 is a block diagram illustrating a software configuration of the MFP 101. A local user interface (local UI) 301 of the MFP 101 provides a user interface using the display of the operation panel 205, and a local access user can change settings of the MFP 101 and use functions of the MFP 101 via the local UI 301. A remote user interface (remote UI) 302 includes a Hypertext Transfer Protocol (HTTP) server function. The remote UI 302 provides a HyperText Markup Language (HTML) user interface to a remote access user.

The user can access the remote UI 302 using the web browser of the PC terminal to change the settings of the MFP 101 and use the functions of the MFP 101. The web browser of the PC terminal displays the HTML user interface. The user can change the settings and use the functions by operating the user interface displayed on the web browser.

The user authentication service 303 is a software module that authenticates the users of the local UI 301 and the remote UI 302. The user authentication service 303 authenticates the user of the local UI 301 based on an IC card and a personal identification number (PIN). Further, the user authentication service 303 authenticates the user of the remote UI 302 based on a username, a password, and a one-time password. An IC card reader driver 304 is a driver that controls the IC card reader 209 to acquire information from an IC card and provide the IC card information to the user authentication service 303.

<One-Time Password>

A one-time password for use in the present embodiment will be described. Time-based One-time Password (TOTP) defined in a request for comments (RFC) 6238 can be used as a method of generating a one-time password. In this method, a one-time password that is authentication information is generated using a TOTP secret generated for each user and time information. The TOTP secret is a random number. Mobile applications (applications for smartphones) that support TOTP are widely used in these days. Examples are Google Authenticator® of Google Inc. and Microsoft Authenticator® of Microsoft Corporation. The TOTP secret is stored in the mobile application supporting TOTP by registering the TOTP secret as a character string in the mobile application or by capturing an image of a Quick Response (QR) code containing the TOTP secret information using the mobile application. In this way, an issuer of the TOTP secret and the mobile application share the TOTP secret. The mobile application supporting TOTP generates a one-time password based on the TOTP secret and time.

Further, there are plug-ins that support TOTP and are installable as an extension function of the web browser of the PC terminal in addition to the mobile applications that support TOTP. According to the present embodiment, the issuer of the TOTP secret is the user authentication service 303. Each user of the MFP 101 uses the mobile application supporting TOTP or the plug-in of the web browser. In general, a one-time password generated using software such as the mobile application or the plug-in of the web browser is referred to as "software token". Further, an authentication method using the software token is referred to as "software token authentication".

According to the present embodiment, the user authentication service 303 generates a TOTP secret and a one-time password and verifies the one-time password based on a request from the local UI 301 or the remote UI 302 by which a user operation is detected.

Further, according to the present embodiment, a state where a TOTP secret associated with an account is recorded in a user information table described below is referred to as "one-time password activated state", whereas a state where a TOTP secret is not recorded in the user information table will be referred to as "one-time password deactivated state".

<User Information>

The user information managed by the user authentication service 303 will be described. The user authentication service 303 manages the user information by storing the user information in the user information table as illustrated in Table 1. The user information table is a database recorded in the HDD 204. A database at another node on the network with encrypted or tamper-proof communication paths and storages may also be used. The user information table stores personal information about each user including authentication information such as card ID for use in IC card authentication, PIN, password, TOTP secret, role, and email address of the user.

TABLE 1

| Username | Card ID | PIN | Password | TOTP Secret | Role | Email Address |
| --- | --- | --- | --- | --- | --- | --- |
| Admin | F1EABB15 . . . | 4799600 | ***** *** | 6fc11e17-faf4 . . . | Administrator | admin@canon.com |
| Alice | 44E7158E . . . | 922524 | ***** *** | 96df7500-7e82 . . . | Administrator | alice@canon.com |
| Bob | 045BB438 . . . | 033886 | ***** *** | | GeneralUser | bob@canon.com |
| Carol | 19E313B6 . . . | 838214 | ***** *** | 1fb233f6-1f8e . . . | GeneralUser | carol@canon.com |
| Dave | BDFDB35 . . . | 375384 | ***** *** | | LimitedUser | dave@canon.com |

The role information is information indicating the right of the user to use the MFP 101. A role information table (Table 2) described below specifies an example of roles and rights to use. The user may be allowed to generate a new role by setting details of a right to use in addition to the definitions of the roles included in the MFP 101 at the time of shipment. The term "to change settings" in Table 2 refers to an act of changing a value set for the MFP 101 such as the user authentication settings and the user management described below. Various settings such as network settings and print function settings of the MFP 101 can also be set changeable. Administrator is a role that is assigned to an administrator user, whereas GeneralUser and LimitedUser are roles that are assigned to a general user.

TABLE 2

| Role | Rights |
| --- | --- |
| Administrator | Allowed to change settings, execute color-printing, and edit address book |
| GeneralUser | Not allowed to change settings but allowed to execute color-printing and refer to address book |
| LimitedUser | Not allowed to change settings, execute color-printing, and refer to address book |

<User Authentication Settings>

Next, the user authentication settings of the MFP 101 will be described. FIG. 4 illustrates an example of a UI for the user authentication settings of the MFP 101 that is provided by the remote UI 302. Not only the remote UI 302 but also the local UI 301 can provide a similar UI to the administrators.

A screen 401 is an entire screen for setting the user authentication settings. Only the administrators having the Administrator role can access the screen 401. The user authentication setting 402 is the user authentication settings for the local UI 301. The user authentication setting 403 is the user authentication settings for the remote UI 302.

An authentication setting 404 is local UI authentication settings and provides options "no authentication" and "IC card authentication". In a case where the option "IC card authentication" is selected, a "use of multi-factor authentication (PIN)" setting 405 is provided. The "use of multi-factor authentication (PIN)" setting 405 provides options "do not require", "require only administrators to use PIN", and "require all the users to use PIN" to the user.

In a case where the option "do not require" is selected and a PIN is recorded in advance in association with the user account, the user is prompted to input the PIN in IC card authentication. In a case where a PIN is not recorded, an operation of allowing the user to log in to the local UI 301 is performed based only on a successful IC card authentication without requesting the user to input a PIN.

In a case where the option "require only administrators to use PIN" or "require all the users to use PIN" is selected, the user is prompted to set a "login of the user without registered PIN" setting 406. The "login of the user without registered PIN" setting 406 is a setting that defines an operation for a case where a user of an account required to use a PIN attempts an IC card authentication in a state where the PIN is not recorded in association with the target account to be required to use the PIN. Options "register PIN in IC card authentication" and "prohibit login to local UI" are provided.

A "use of multi-factor authentication (one-time password)" setting 407 is a remote UI multi-factor authentication setting. Options "do not require", "require only administrators to use one-time password", and "require all the users to use one-time password" are provided to the user.

In a case where the option "do not require" is selected, the user accessing the remote UI 302 is authenticated using the username and the password. Each user can select whether to use a one-time password. In a case where the one-time password is activated by the user, the user is prompted to input the one-time password in addition to the username/password authentication. In a case where the one-time password is not activated, an operation of allowing the user to log in to the remote UI 302 is performed based only on a successful username/password authentication without requesting the user to input the one-time password.

In a case where the option "require only administrators to use one-time password" or "require all the users to use one-time password" is selected, the user is prompted to set a "login of user without registered one-time password" setting 408. The "login of user without registered one-time password" setting 408 is a setting that defines an operation for a case where the user of the account attempts a user authentication to the remote UI 302 in a state where the one-time password is not activated in advance. Options "register one-time password in login to remote UI" and "prohibit login to remote UI (register one-time password on local UI in next login to local UI)" are provided.

While the multi-factor authentication setting is provided to each of the local UI 301 and the remote UI 302 separately according to the present embodiment, a single multi-factor authentication setting can be provided as a common setting applied to both the local UI 301 and the remote UI 302. In this case, any authentication method can be employed, and options "do not require", "require only administrators to use multi-factor authentication", and "require all the users to use multi-factor authentication" are provided as a multi-factor authentication requirement setting. Further, options "set multi-factor authentication in login" and "prohibit login" are provided to a user for which the multi-factor authentication is not set.

<User Management>

FIG. 5 illustrates an example of a UI that is provided by the remote UI 302 and manages the user accounts of the MFP 101. Not only the remote UI 302 but also the local UI 301 may provide a similar UI to the administrators.

A user management screen 501 is a user management screen that manages a list of user accounts. Only the administrators having the Administrator role can access the user management screen 501. A function of registering a new user account and selecting a registered account to edit/delete the selected account is provided on the user management screen 501. For example, in a case where "Admin" selects the account "Alice" and presses an edit button on the user management screen 501, the remote UI 302 displays a user editing screen 502. The password, PIN, card ID, email address, and role can be edited and the edited password, PIN, card ID, email address, and role can be stored on the user editing screen 502. Further, the user editing screen 502 displays the state (activated/deactivated) of the one-time password for use in user authentication to the remote UI 302. The administrators can initialize (deactivate) the one-time password on the user editing screen 502. A function of activating the one-time password is not provided on the user editing screen 502.

<My-Profile Editing>

Figure 6:
FIG. 6 is a diagram illustrating a user interface for editing a my-profile.

FIG. 6 illustrates an example of a UI for editing a my-profile that is provided by the remote UI 302.

A my-profile editing screen 601 is a UI on which a user having logged in to the remote UI 302 can check and edit account information about the user. The my-profile editing screen 601 is provided to every user allowed to log in to the remote UI 302. Not only the remote UI 302 but also the local UI 301 may provide a similar UI. The password, PIN, and email address can be edited and the edited password, PIN, and email address can be stored on the my-profile editing screen 601. The user cannot change the role of the user. According to the present embodiment, the PIN is to be used on the local UI 301, so that setting the PIN from the remote UI 302 can be prohibited, or the PIN does not have to be set.

A function of checking the state of the one-time password for use in user authentication to the remote UI 302 and activating or deactivating the one-time password is provided on the my-profile editing screen 601. In a case where the press of an activation button 602 is detected, the remote UI 302 generates a QR code containing a TOTP secret via the user authentication service 303 and displays a one-time password activation screen 603. The QR code has a following character string format. The QR code contains an identifier of the MFP 101 that is the issuer of the TOTP secret, user account name, TOTP secret, one-time password generation algorithm, one-time password character length, and activated period (seconds). otpauth://totp/MFP101:alice@canon.com?secret=GVQYVMXCE5KDCMXUKQ-IKLZJEHCDYHLHG&issuer=MFP101&algorithm=SHA-1&digits=6&period=30

The user reads the QR code using the mobile application supporting TOTP of the mobile terminal 104. The mobile application acquires information including the TOTP secret from the QR code. The mobile application generates a one-time password by the method defined in RFC 6238 using the information acquired from the QR code and time information and displays the generated one-time password on a screen of the mobile application. The one-time password activation screen 603 requests the user to input the one-time password in order to check whether the one-time password is correctly generated using the mobile application. In a case where the one-time password is input to the one-time password activation screen 603, the remote UI 302 requests the user authentication service 303 to verify the input one-time password.

The user authentication service 303 generates the one-time password by the method defined in RFC 6238 using current time information and the TOTP secret and verifies the generated one-time password with the input one-time password. The one-time password is changed every 30 seconds. To allow a difference in time setting between the mobile application and the MFP 101, the one-time password at the time 30 seconds before the time information and the one-time password at the time 30 seconds after the time information may also be calculated to compare and verify the input one-time password with the plurality of one-time passwords. In a case where the one-time password is successfully verified, the user authentication service 303 stores the TOTP secret in association with the account in the user information table (Table 1) and ends the one-time password activation process. The settings and the user information table are stored in the HDD 204 and are referred to during execution of operations.

<Login Operation>

Next, operations in allowing the user to log in to the MFP 101 will be described with reference to a flowchart. According to the present embodiment, a process illustrated in the flowchart described below is recorded in a software program of the local UI 301, the remote UI 302, the user authentication service 303, and the IC card reader driver 304. The software program is stored in a non-volatile storage such as the ROM 202 or the HDD 204 and is loaded to the RAM 203 to execute the process illustrated the flowchart by the CPU 201. Further, the local UI 301, the remote UI 302, the user authentication service 303, and the IC card reader driver 304 provide an application programming interface (API) to one another and operate in cooperation with one another using the APIs. Descriptions of operations of calling the APIs in the process described below are omitted.

<Process of Logging in to Local UI>

Figure 7:
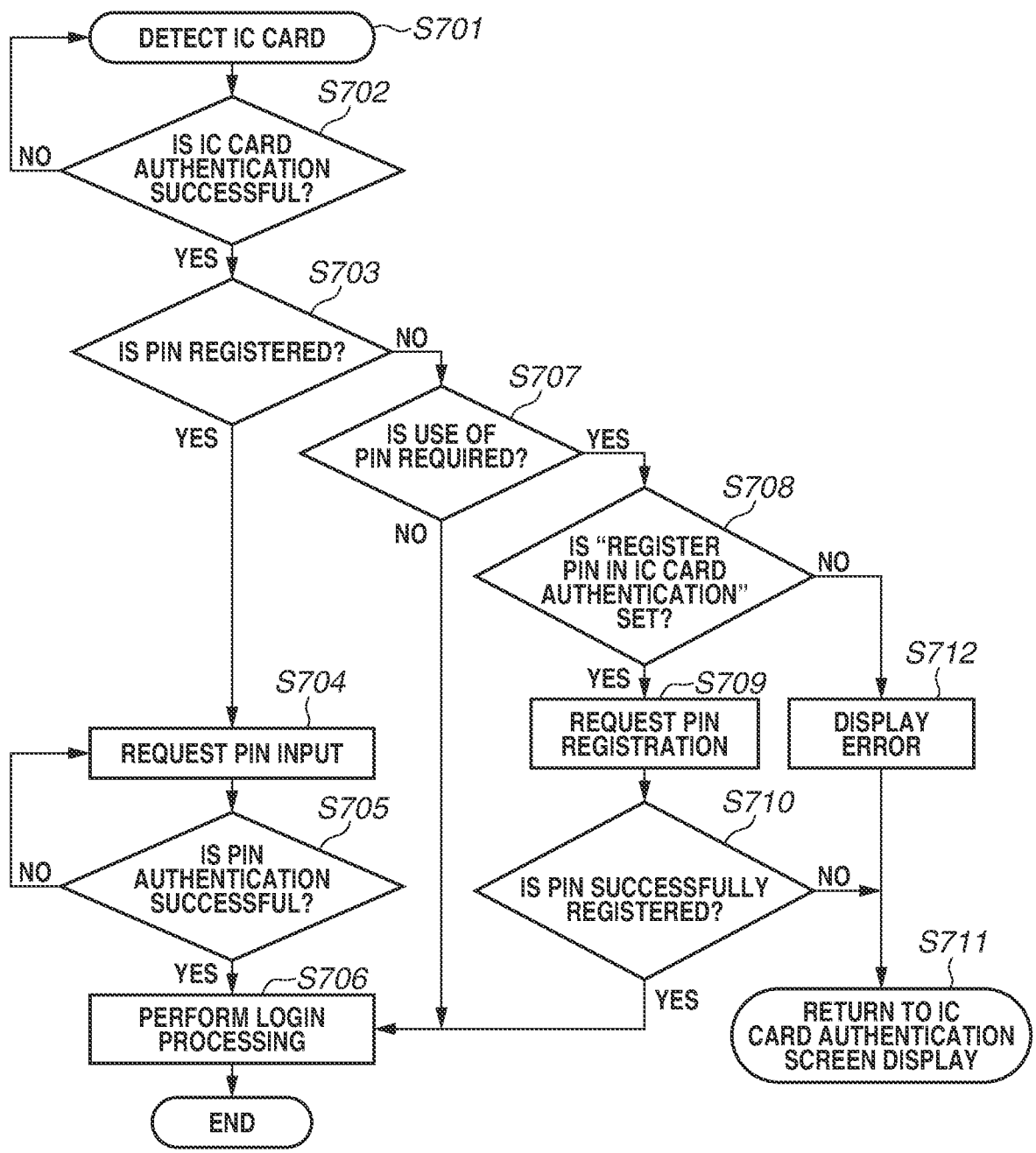
FIG. 7 is a flowchart illustrating a process of integrated circuit (IC) card authentication on a local user interface (local UI).
Figure 8:
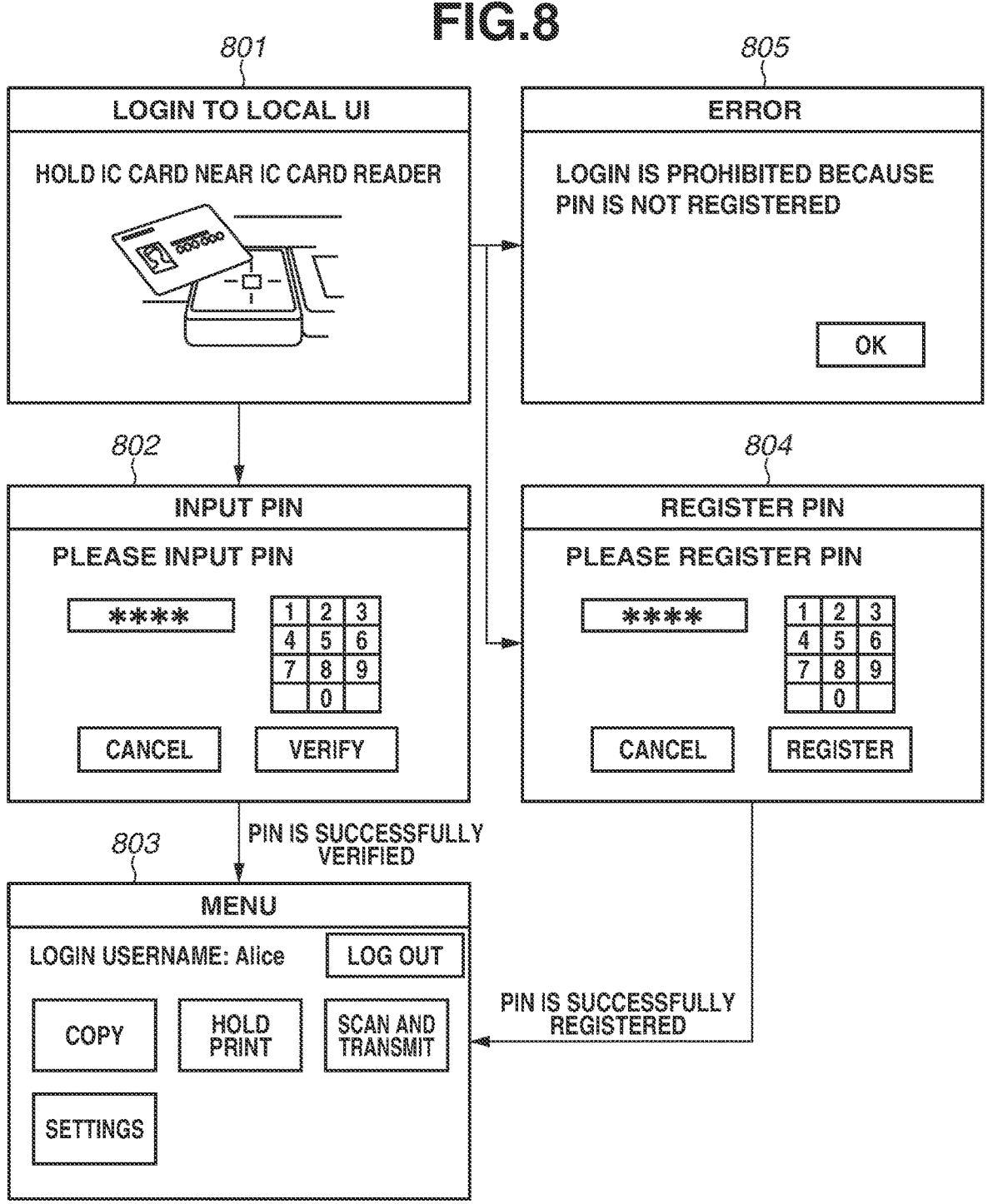
FIG. 8 is a diagram illustrating screens displayed on an operation panel by the local UI and screen transitions.

A process of logging in to the local UI 301 will be described with reference to FIGS. 7 and 8. FIG. 7 is a flowchart illustrating a process of IC card authentication on the local UI 301. FIG. 8 is a diagram illustrating screens displayed on the operation panel 205 by the local UI 301 and screen transitions In a case where "IC card authentication" of the local UI authentication setting 404 is set, the local UI 301 displays an IC card authentication screen 801 on the operation panel 205 when the MFP 101 is activated. The user authentication service 303 drives the IC card reader 209 using the IC card reader driver 304 to be ready to detect an IC card.

In step S701, the user authentication service 303 detects, via the IC card reader driver 304, an IC card held near the IC card reader 209. In step S702, the user authentication service 303 authenticates the detected IC card by acquiring the card ID of the detected IC card and verifying the detected IC card with the IC cards registered in the user information table (Table 1) and determines the result. In a case where the card ID is unregistered (NO in step S702), an authentication error is displayed, and the IC card authentication screen 801 is displayed again. Then, the processing returns to step S701. On the other hand, in a case where the verification with the registered card IDs is successful (YES in step S702), an account associated with the card ID is identified. Then, the processing proceeds to step S703.

Next, in step S703, the PIN of the identified account is referred to, and whether the PIN is registered is determined. In a case where the PIN is registered (YES in step S703), the processing proceeds to step S704. In step S704, a PIN input screen 802 is displayed to request PIN input. Next, in step S705, the user authentication service 303 verifies the input PIN, authenticates the PIN, and determines the result. In a case where the input PIN is correct (YES in step S705), the processing proceeds to step S706. In step S706, the process of allowing the user to log in to the MFP 101 is performed. On the other hand, in a case where the PIN verification is unsuccessful (NO in step S705), the processing returns to step S704. A message is displayed to notify the user that the PIN does not match, and the PIN input screen 802 is displayed again to request PIN input again. In a case where an input error occurs a predetermined number of times or more successively, it is determined that there is an attack, and the account is locked for a predetermined period.

In step S706, the user allowed to log in is assigned the role of the user and the rights associated with the role by referring to the user information table (Table 1) and the role information table (Table 2), and control is performed to allow the user to log in to the MFP 101. A menu screen 803 for allowing to use the functions of the MFP 101 that is provided by the local UI 301 is displayed, and the login operation ends. The display of the menu screen 803 is controlled to gray out each function that the user does not have the right to use so that the user cannot select the function.

On the other hand, in step S703, in a case where it is determined that the PIN is not registered (NO in step S703), the processing proceeds to step S707. In step S707, the "use of multi-factor authentication (PIN)" setting 405 stored in the HDD 204 and the role of the identified account are referred to, and whether the use of the PIN is required to the account to log in is determined based on the information. For example, in a case where the option "require only administrators to use PIN" is set and the role of the account of the user that is identified by the IC card authentication is Administrator, it is determined that use of the PIN is required. In a case where use of the PIN is not required (NO in step S707), the processing proceeds to step S706. In step S706, the process of allowing the user to log in to the MFP 101 is performed.

On the other hand, in a case where the use of the PIN is required (YES in step S707), the processing proceeds to step S708. In step S708, the "login of the user without registered PIN" setting 406 stored in the HDD 204 is referred to, and the option set for the user without a registered PIN is checked. In a case where the option "register PIN in IC card authentication" is set (YES in step S708), the processing proceeds to step S709. In step S709, a PIN registration screen 804 is displayed to request the user to register the PIN. Next, in step S710, whether the PIN is successfully registered is determined. In a case where successful PIN registration is confirmed (YES in step S710), the processing proceeds to step S706. In step S706, the process of allowing the user to log in to the MFP 101 is performed. On the other hand, in a case where the PIN registration is refused (NO in step S710), the processing proceeds to step S711. In step S711, the IC card authentication screen 801 is displayed again. In the determination in step S708, in a case where the option "prohibit login to local UI" is set (NO in step S708), the processing proceeds to step S712. In step S712, a message indicating that the login is prohibited because the PIN is not registered is displayed on an error screen 805. In a case where the error screen 805 is closed, the processing proceeds to step S711. In step S711, the IC card authentication screen 801 is displayed again.

<Process of Logging in to Remote UI>

Figure 9:
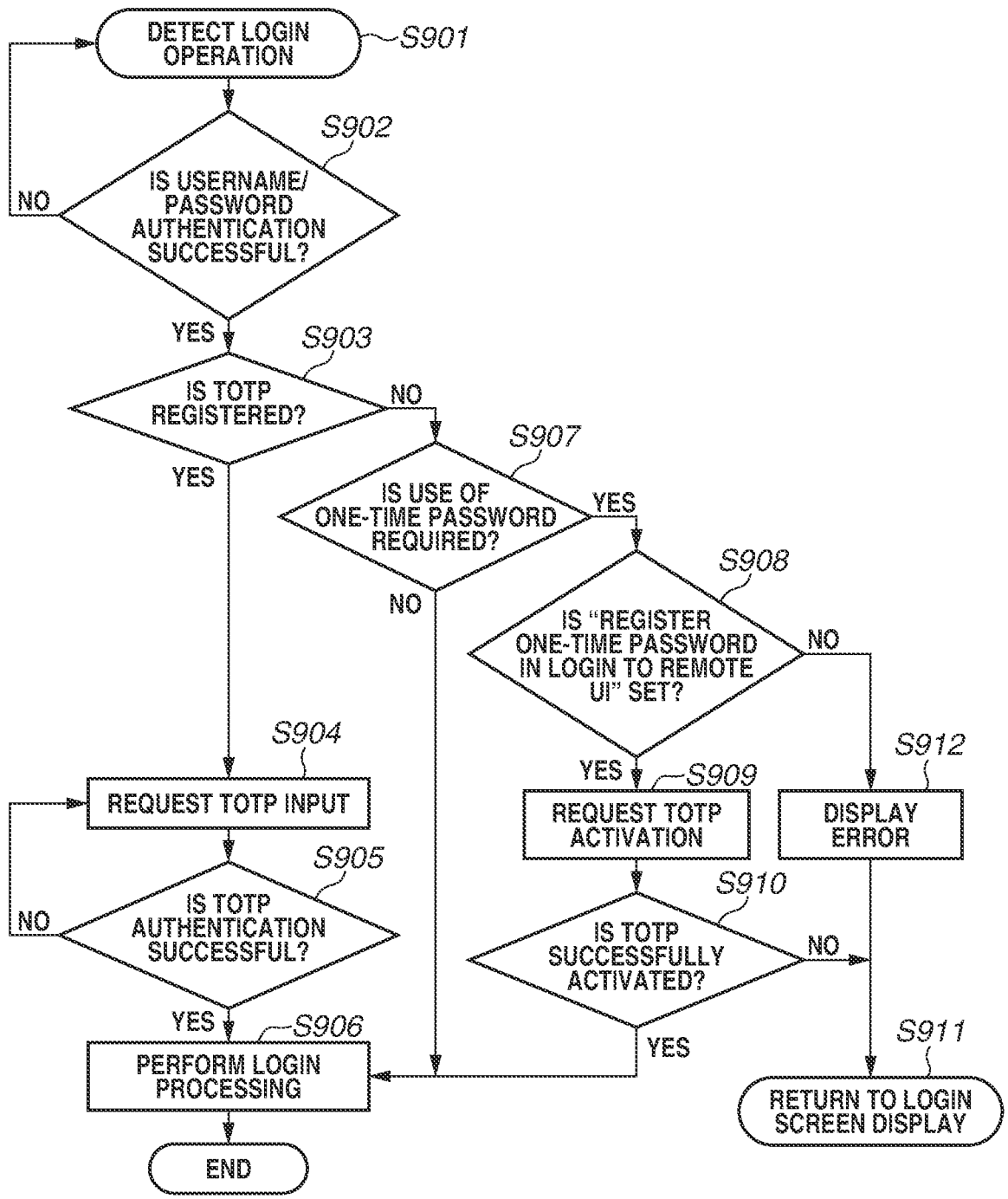
FIG. 9 is a flowchart illustrating a process of user authentication on a remote user interface (remote UI).
Figure 10:
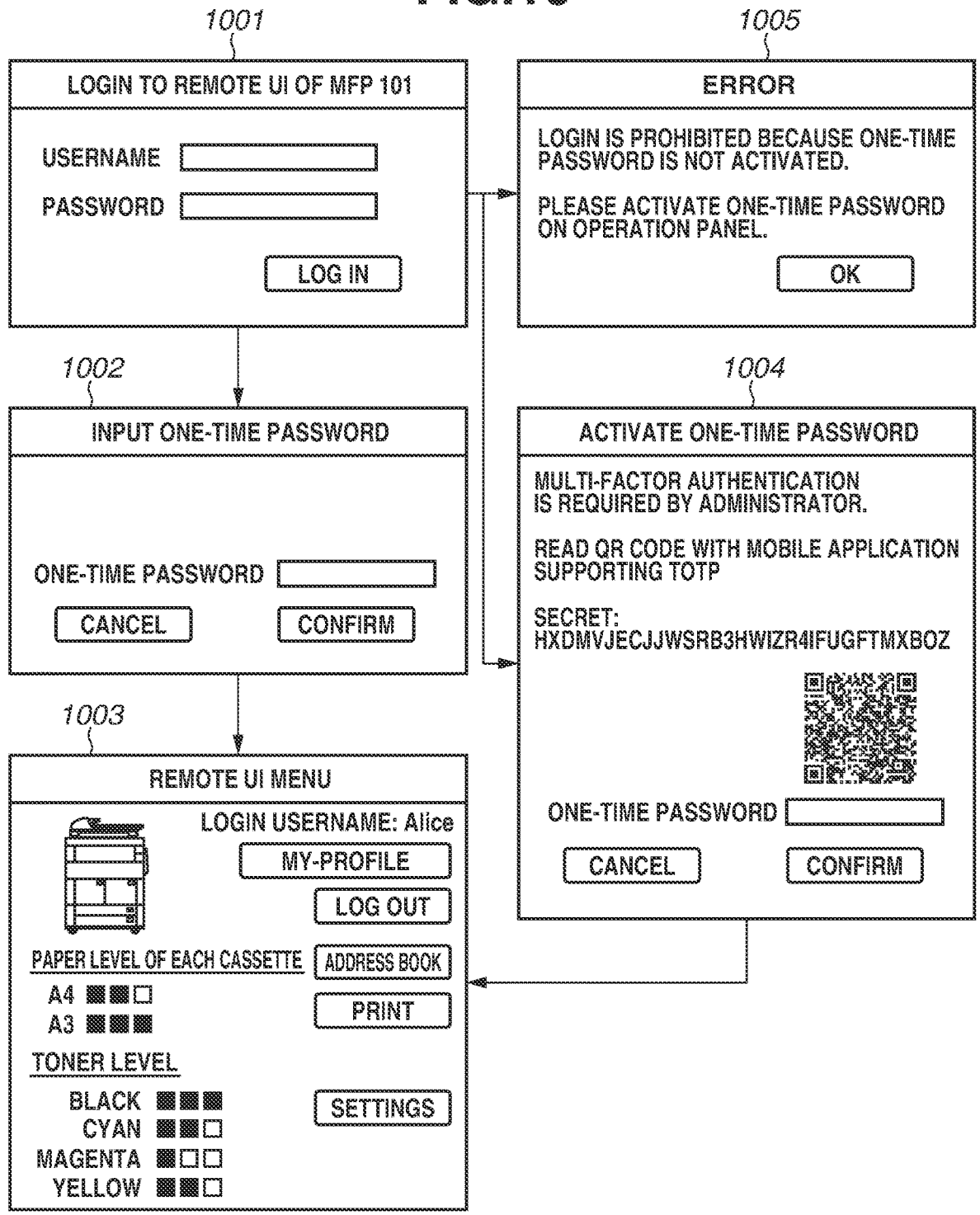
FIG. 10 is a diagram illustrating screens provided to a web browser of a personal computer (PC) by the remote UI and screen transitions.

A process of logging in to the remote UI 302 will be described with reference to FIGS. 9 and 10. FIG. 9 is a flowchart illustrating a process of user authentication on the remote UI 302. FIG. 10 is a diagram illustrating HTML screens provided to the web browser of the PC terminal by the remote UI 302 and screen transitions.

In a case where access to the remote UI 302 is detected, the remote UI 302 provides and displays a remote UI login screen 1001. In step S901, the remote UI 302 detects a login operation in a case where the user inputs the username and the password and presses a log in button. In step S902, the user authentication service 303 authenticates the user by referring to the user information table (Table 1) and verifying the input username and the input password. In a case where the verification is unsuccessful (NO in step S902), the processing returns to step S901. In step S901, an authentication error is displayed, and then the login screen 1001 is displayed again to request username/password input. In a case where the username/password verification is successful (YES in step S902), the successfully-verified account is identified. The processing proceeds to step S903.

Next, in step S903, the TOTP secret of the identified account in the user information table (Table 1) is referred to, and whether the TOTP secret is registered is determined. In a case where the TOTP secret is registered (YES in step S903), it is determined that the one-time password is activated, and the processing proceeds to step S904. In step S904, a one-time password input screen 1002 is displayed to request one-time password input. Next, in step S905, the input one-time password is authenticated by verifying the input one-time password with the one-time password calculated by the user authentication service 303 based on the time information and the TOTP secret.

In a case where the input one-time password is correct (YES in step S905), the processing proceeds to step S906. In step S906, the process of allowing the user to log in to the MFP 101 is performed. On the other hand, in a case where the verification of the one-time password is unsuccessful (NO in step S905), the processing returns to step S904. In step S904, a message is displayed to notify the user that the one-time password does not match, and the one-time password input screen 1002 is displayed again to request one-time password input again. In a case where an input error occurs a predetermined number of times or more successively, it is determined that there is an attack, and the account is locked for a predetermined period.

In step S906, the user to be allowed to log in is assigned the role of the user and the rights associated with the role by referring to the user information table (Table 1) and the role information table (Table 2), and control is performed to allow the user to log in to the MFP 101. A menu screen 1003 for using the functions of the MFP 101 that is provided by the remote UI 302 is displayed, and the login operation ends. The display of the menu screen 1003 is controlled to gray out each function that the user does not have the right to use so that the user cannot select the function.

On the other hand, in step S903, in a case where it is determined that the TOTP secret is not registered and the one-time password is not activated (NO in step S903), the processing proceeds to step S907, and the "use of multi-factor authentication (one-time password)" setting 407 stored in the HDD 204 and the role of the identified account are referred to.

In step S907, whether the account attempting to log in is required to use the one-time password is determined based on the information. For example, in a case where the option "require only administrators to use one-time password" is set and the role of the account of the user that is identified by username/password authentication is Administrator, it is determined that use of the one-time password is required.

In a case where use of the one-time password is not required (NO in step S907), the processing proceeds to step S906. In step S906, the process of allowing the user to log in to the MFP 101 is performed. On the other hand, in a case where the use of the one-time password is required (YES in step S907), the processing proceeds to step S908. In step S908, the "login of user without registered one-time password" setting 408 stored in the HDD 204 is referred to, and the option set for the user without a registered one-time password is checked. In a case where the option "register one-time password in login to remote UI" is set (YES in step S908), a one-time password activation screen 1004 is displayed. This is a response to the remote access. Then, the processing proceeds to step S909.

In step S909, the one-time password activation screen 1004 requests the user to input the one-time password for checking whether the one-time password is correctly generated by the user using the mobile application. Next, in a case where the press of a confirm button is detected, the input one-time password is verified, and in a case where the one-time password is correct, the TOTP secret is recorded in the user information table (Table 1), and the activation ends.

In step S910, whether the one-time password is successfully activated is determined. In a case where successful activation of the one-time password is confirmed (YES in step S910), the processing proceeds to step S906. In step S906, the process of allowing the user to log in to the MFP 101 is performed. In a case where the press of a cancel button by the user to refuse activation of the one-time password is detected (NO in step S910), the processing proceeds to step S911. In step S911, the remote UI login screen 1001 is displayed again. In the determination in step S908, in a case where the option "prohibit login to remote UI (set one-time password on local UI in next login to local UI)" is set (NO in step S908), the processing proceeds to step S912. In step S912, an error screen 1005 displays a message indicating that "login is prohibited because one-time password is not activated" and a message indicating that "activation of one-time password on operation panel is recommended". In a case where the error screen 1005 is closed, the processing proceeds to step S911. In step S911, the remote UI login screen 1001 is displayed again.

<Operations of Activating One-time Password on Local UI>

Operations of logging in to the local UI 301 in a case where the option "prohibit login to remote UI (set one-time password on local UI in next login to local UI)" of the "login of user without registered one-time password" setting 408 is set will be described with reference to FIG. 11.

In a case where logging in to the local UI 301 is successful (YES in step S704), the TOTP secret of the logged-in account in the user information table (Table 1) is referred to and whether the one-time password is activated is determined in the login process in step S706 in FIG. 7. In a case where it is determined that the one-time password is not activated, a screen 806 is displayed to prompt activation of the one-time password for the remote UI 302.

In a case where the user selects "YES", a remote UI one-time password activation screen 807 is displayed. Next, an input one-time password is verified, and in a case where the one-time password is correct, the TOTP secret is recorded in the user information table (Table 1). In a case where successful activation of the one-time password is confirmed, the user is allowed to log in to the MFP 101, and the menu screen 803 is displayed. In a case where the user activates the one-time password on the local UI 301, it is determined that the one-time password is activated in logging in to the remote UI 302, so that the user can proceeds to not the error screen 1005 but the one-time password input screen 1002.

In a case where "NO" is selected on the screen 806 prompting activation of the one-time password for the remote UI 302, the user is allowed to log in to the MFP 101 without displaying the remote UI one-time password activation screen 807, and the menu screen 803 is displayed. There is a user having no intention to activate the one-time password for the remote UI 302 because the user does not use the remote UI 302. The user of this type can select an option "do not display again" on the screen 806 prompting activation of the one-time password, and the selected option "do not display again" is stored in the user information table (Table 1). The display of the screen 806 prompting activation of the one-time password is controlled not to display the screen 806 to the user having selected the option "do not display again" even in a case where the TOTP secret is not recorded.

Figure 11:
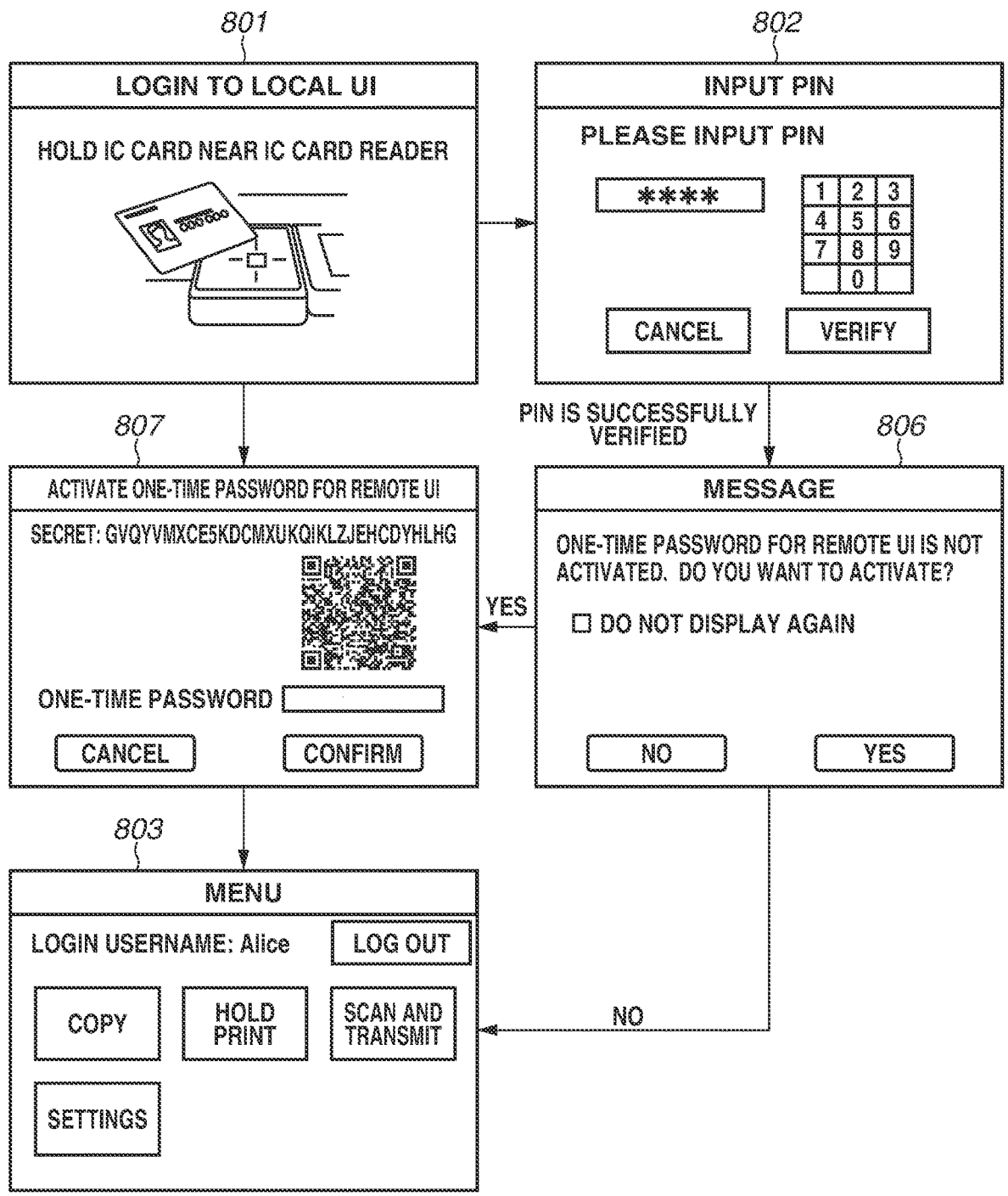
FIG. 11 is a diagram illustrating screens displayed on the operation panel by the local UI and screen transitions.

The foregoing descriptions with reference to FIG. 11 are based on a case where the PIN is set by the user. In a case where the PIN is not set by the user, the PIN registration screen 804 may be changed to the screen 806 prompting activation of the one-time password for the remote UI 302.

Advantages of First Embodiment

As described above, the MFP 101 according to the present embodiment can provide multi-factor authentication that includes IC card authentication and PIN, is relatively few in number of operations, and is highly convenient to a user in locally accessing the operation panel 205.

For remote access that cannot use the IC card authentication, a multi-factor authentication process different from that for local access is provided. This enhances security of the MFP 101, and the user can safely use remote access.

Since the setting that requires multi-factor authentication of local access and the setting that requires multi-factor authentication of remote access are separately set, for example, an operation of requiring multi-factor authentication of remote access but not requiring multi-factor authentication of local access can be employed. This operation is suitable in a case where another physical means is provided to allow only limited users to access an operation panel, for example, office entrance management. In this way, a suitable setting is set for each environment where the MFP 101 is installed.

Further, whether to require multi-factor authentication is selectable based on the role of the user by selecting the corresponding setting. Thus, an operation of applying multi-factor authentication to only users having administrator rights but not applying multi-factor authentication to general users allowed to access only limited items based on rights can be employed.

While the user authentication processes for local access and remote access are different, the configuration is designed so that the same user can use the MFP 101 based on the same role and rights. Thus, the functions of the MFP 101 can be used based on the same rights without being affected by the difference in access processes.

The configuration is designed so that the administrators can select, via setting in advance, whether to reject login or to prompt the user to set second-factor authentication in a case where first-factor authentication of multi-factor authentication is successful but the second-factor authentication of multi-factor authentication is not set.

Although an administrator makes the setting to require multi-factor authentication, in a case where the users leave the MFP 101 without logging in to the MFP 101 for a long time, there is a risk that multi-factor authentication is substantially not activated for a long time. In a case where the setting to reject login of the user having not set the second-factor authentication is set, a risk of unauthorized login by an attacker having improperly acquired the first factor (IC card, password) of the authentication is prevented.

In a case where the setting to reject login of the user having not set the PIN that is the second factor of multi-factor authentication of local access is set, the PINs of all users need to be set before the setting to require use of multi-factor authentication is implemented. In a case where it is difficult to set the PINs of all users, an operation of prompting the user to set the second-factor authentication is selectable via setting in a case where the user having not set the second-factor authentication of multi-factor authentication attempts to log in.

In a case where the second-factor authentication (one-time password) of remote access is not activated, the second-factor authentication (one-time password) of remote access can be activated by local access while login via the remote access is rejected.

In this way, the administrators of the MFP 101 provide a method of activating the second-factor authentication of remote access to the users while securely protecting remote access using two-factor authentication.

According to the first embodiment, only a user can activate the one-time password of the user that is the second factor of multi-factor authentication of remote access. Accordingly, there is a risk that the authentication remains a single-factor authentication state until the users activate the one-time password. Further, according to the first embodiment, the multi-factor authentication of remote access is activated by local access. It is, however, inconvenient for a remote user to visit the local place to make the setting.

Thus, according to a second embodiment, an administrator forcibly activates the one-time password of another user. Only a difference between the present embodiment and the first embodiment will be described.

Figure 12:
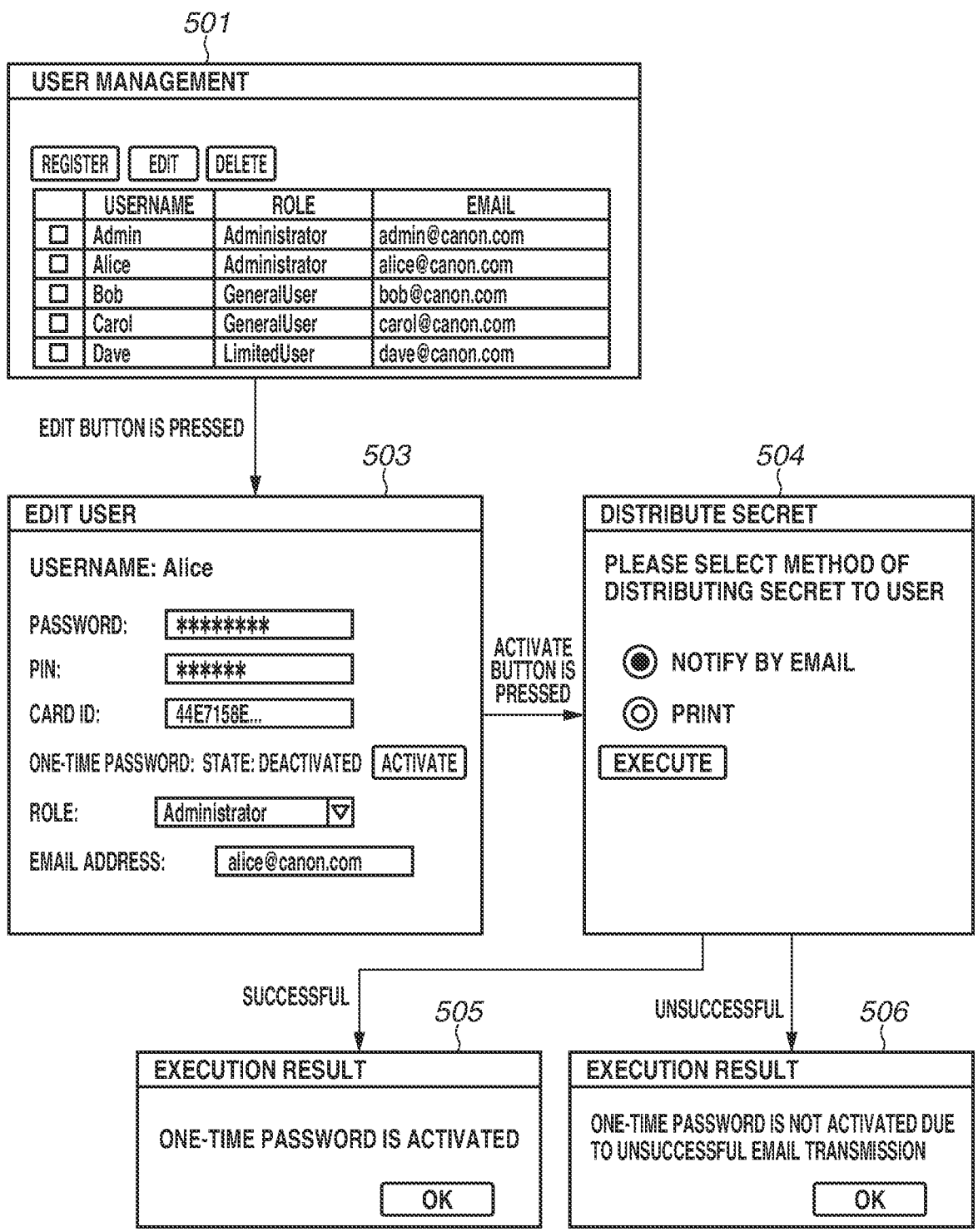
FIG. 12 is a diagram illustrating a user interface for user management according to a second embodiment.

FIG. 12 illustrates a user management screen via which an administrator can forcibly activate the one-time password of another user.

In a case where a user account is selected and the edit button is pressed on the user management screen 501 provided to the remote UI 302, the user editing screen 502 is displayed. A case where "Admin" selects the account of "Alice" and presses the edit button on the user management screen 501 will be described as an example. In a case where the state of the one-time password of the account of "Alice" is "deactivated", the user editing screen 502 provides the function to "activate" the one-time password.

In a case where the remote UI 302 detects the press of the "activate" button, a screen 504 is displayed to prompt the user to select a TOTP secret distribution method. An option "notify by email" or "print" is selectable as the TOTP secret distribution method on the screen 504.

In a case where an operation of selecting the option "notify by email" and pressing an "execute" button is detected, the user authentication service 303 generates the TOTP secret and transmits a character string of the TOTP secret and an image of the QR code to the email address of "Alice". In a case where a notification of completion of transmission is received from an email server as a response result to the email transmission, the user authentication service 303 stores the TOTP secret in the user information table (Table 1) and displays a message indicating that the activation is successful on the remote UI 302 (screen 505). Electronic communications other than email, such as a short message service using a telephone number, may be employed. In a case where the press of an OK button is detected, the user editing screen 502 on which the state of the one-time password is changed from "deactivated" to "activated" is displayed. In a case where an error is received from the email server as a response result to the email transmission, the user authentication service 303 discards the TOTP secret and displays a message indicating that the activation is unsuccessful on the remote UI 302 (screen 506). In a case where the press of an OK button is detected, the user editing screen 502 on which the state of the one-time password remains "deactivated" is displayed.

FIG. 13 illustrates an example of a transmitted email. A header portion 1301 of the email, a body 1302 of the email, and an attachment portion 1303 are illustrated therein. "Alice" can generate the one-time password using the character string of the TOTP secret and the QR code acquired from the email and the mobile application supporting TOTP. Alternatively, a universal resource locator (URL) of the screen for activating the two-factor authentication that is provided by the remote UI 302 is generated for Alice only, and the generated URL is transmitted via email. "Alice" accesses the URL acquired from the email and acquires the character string of the TOTP secret and the QR code. A risk of improper access to the URL for "Alice" by someone else is reduced by, for example, allowing access to the URL only during a limited period.

On the other hand, in a case where an operation of selecting the option "print" and pressing the "execute" button on the screen 504 is detected, the user authentication service 303 issues the TOTP secret and prints the character string of the TOTP secret and the QR code on a sheet using the printer 206. In a case where the printing is successful, the TOTP secret is stored in the user information table (Table 1), and the message indicating that the activation is successful is displayed on the remote UI 302 (screen 505). In a case where the press of the OK button is detected, the user editing screen 502 on which the state of the one-time password is changed from "deactivated" to "activated" is displayed. In a case where the printing is unsuccessful because the printer 206 runs out of paper, the user authentication service 303 discards the TOTP secret and displays the message indicating that the activation is unsuccessful on the remote UI 302 (screen 506). In a case where the press of the OK button is detected, the user editing screen 502 on which the state of the one-time password remains "deactivated" is displayed.

"Admin" having executed the printing performs an operation of distributing the sheet with the character string of the TOTP secret and the QR code printed thereon to "Alice". Alice can generate the one-time password using the character string of the TOTP secret and the QR code printed on the obtained sheet and the mobile application supporting TOTP.

Further, while not illustrated, a plurality of user accounts may be selected to forcibly activate the one-time passwords of the selected user accounts together. In this case, the user authentication service 303 collectively generates the character strings of the TOTP secrets and the images of the QR codes for the plurality of selected users and either transmits the generated character strings of the TOTP secrets and the images of the QR codes to the email addresses of the users or prints the generated character strings of the TOTP secrets and the images of the QR codes together.

Advantages of Second Embodiment

According to the second embodiment, an administrator forcibly issues the TOTP secret and distributes the issued TOTP secret. This reduces the risk that the users do not set the two-factor authentication and leave it after the administrator sets the setting to require multi-factor authentication.

Further, the general users can obtain the character strings of the TOTP secrets and the images of the QR codes without accessing the MFP 101 and operating the UI. This is convenient. Further, since the email and the sheet can be stored, even if the mobile terminal 104 is lost, the one-time password can be generated using another mobile terminal, and the identity of the user is proved based on the possession of the character string of the TOTP secret and the image of the QR code.

OTHER EMBODIMENTS

According to the first and second embodiments, the second-factor authentication of the local UI 301 and the second-factor authentication of the remote UI 302 use different authentication methods. More specifically, the former is the PIN, and the latter is the one-time password supporting TOTP. Alternatively, for example, a combination of a plurality of "possession information" can be employed without considering a combination of a plurality of "knowledge information", "possession information", and "biometric information", and the second-factor authentication of the local UI 301 may use the one-time password supporting TOTP as in the second-factor authentication of the remote UI 302. The same applies to the first-factor authentication. As a result, there may be a case where both the first-factor authentication of the local UI 301 and the first-factor authentication of the remote UI 302 use the login ID and password and the second-factor authentication of the local UI 301 and the second-factor authentication of the remote UI 302 use the one-time password supporting TOTP.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2021-009132, filed Jan. 22, 2021, which is hereby incorporated by reference herein in its entirety.

What is claimed is:

1. An image forming apparatus having a function including at least a print function, the image forming apparatus comprising:
   a first authentication unit configured to authenticate local access to a local user interface function of the image forming apparatus; and
   a second authentication unit configured to authenticate remote access to a remote user interface function of the image forming apparatus,
   wherein the first authentication unit and the second authentication unit support multi-factor authentication, and at least one authentication factor of the second authentication unit is different from an authentication factor of the first authentication unit, and
   wherein the first authentication unit and/or the second authentication unit does not perform multi-factor authentication on local access or remote access by a general user but performs multi-factor authentication on local access or remote access by an administrator user.

2. The image forming apparatus according to claim 1, wherein one authentication factor of the first authentication unit is integrated circuit card authentication using an integrated circuit card reader of the image forming apparatus, and the authentication factor of the second authentication unit does not include the integrated circuit card authentication.

3. The image forming apparatus according to claim 1, wherein authentication based on possession information is set as one authentication factor of the first authentication unit supporting multi-factor authentication and as one authentication factor of the second authentication unit supporting multi-factor authentication, and software token authentication is set as the authentication based on the possession information of the second authentication unit.

4. The image forming apparatus according to claim 3, wherein the second authentication unit with the software token authentication set as one authentication factor provides a secret for issuing a software token by a mobile application of a mobile terminal.

5. The image forming apparatus according to claim 4, wherein the second authentication unit with the software token authentication set as one authentication factor provides, in a case where the image forming apparatus is remotely accessed after execution of multi-factor authentication of the second authentication unit is activated and it is determined that authentication information for the software token authentication is not activated, the secret as a response to the remote access.

6. The image forming apparatus according to claim 4, wherein the second authentication unit with the software token authentication set as one authentication factor provides, in a case where the image forming apparatus is locally accessed after the execution of multi-factor authentication of the second authentication unit is activated and it is determined that the authentication information for the software token authentication is not activated, the secret as a response to the local access.

7. The image forming apparatus according to claim 4, wherein the second authentication unit with the software token authentication set as one authentication factor transmits, in a case where the execution of multi-factor authentication of the second authentication unit is activated, the secret via electronic communication or prints the secret.

8. The image forming apparatus according to claim 1, wherein in a case where the authentication information is not set for one authentication factor of multi-factor authentication, the first authentication unit and/or the second authentication unit does not allow to set the authentication information and prohibits access.

9. A method of controlling an image forming apparatus having a function including at least a print function, the method comprising:
   authenticating, as a first authentication, local access to a local user interface function of the image forming apparatus; and
   authenticating, as a second authentication, remote access to a remote user interface function of the image forming apparatus,
   wherein the first authentication and the second authentication support multi-factor authentication, and at least one authentication factor of the second authentication is different from an authentication factor of the first authentication, and
   wherein the first authentication and/or the second authentication does not perform multi-factor authentication on local access or remote access by a general user but performs multi-factor authentication on local access or remote access by an administrator user.

10. A non-transitory computer-readable storage medium storing a program for causing an image forming apparatus to execute the control method according to claim 9.

* * * * *